United States Patent

[11] 3,590,366

[72] Inventors Eldon D. Vaughn Berkeley, Calif.;

[21] Appl. No. 851,522

[22] Filed June 27, 1969 Division of Ser. No. 595,528, Nov. 18. 1966, abandoned.

[45] Patented June 29, 1971

[73] Assignees American Optical Corporation Southbridge, Mass.;

[54] VARIABLE ATTENUATOR
14 Claims, 16 Drawing Figs.

[52] U.S. Cl. .......... 323/74, 323/80, 323/94R, 333/81R, 340/347AD,

[51] Int. Cl. .......... H03k 13/02

[50] Field of Search .......... 333/81, 324/115; 323/74, 80, 81, 94; 307/155; 340/347 AD

[56] References Cited

UNITED STATES PATENTS

| | | | |
|---|---|---|---|
| 3,521,269 | 7/1970 | Brooks et al. | 340/347 AD |
| 1,975,709 | 10/1934 | Blumlein | 333/81 |
| 2,813,987 | 11/1957 | Taylor | 323/74 X |
| 3,144,625 | 8/1964 | Blonder | 333/81 |
| 3,273,143 | 9/1966 | Wasserman | 323/80 X |
| 3,305,769 | 2/1967 | Julie | 323/74 |

*Primary Examiner*—J. D. Miller
*Assistant Examiner*—A. D. Pellinen
*Attorneys*—Gregg & Stidham

ABSTRACT: A dual beam spectrophotometer converts analog signals from beam detectors to a digital output proportional to the logarithm of the ratio of the analog signals. A variable attenuator for use in the converter has a plurality of resistor pi networks, each network having a series branch and a pair of shunt branches. Switches in the shunt branches attain variable attenuation without varying the input resistance of the attenuator.

Figure 1:
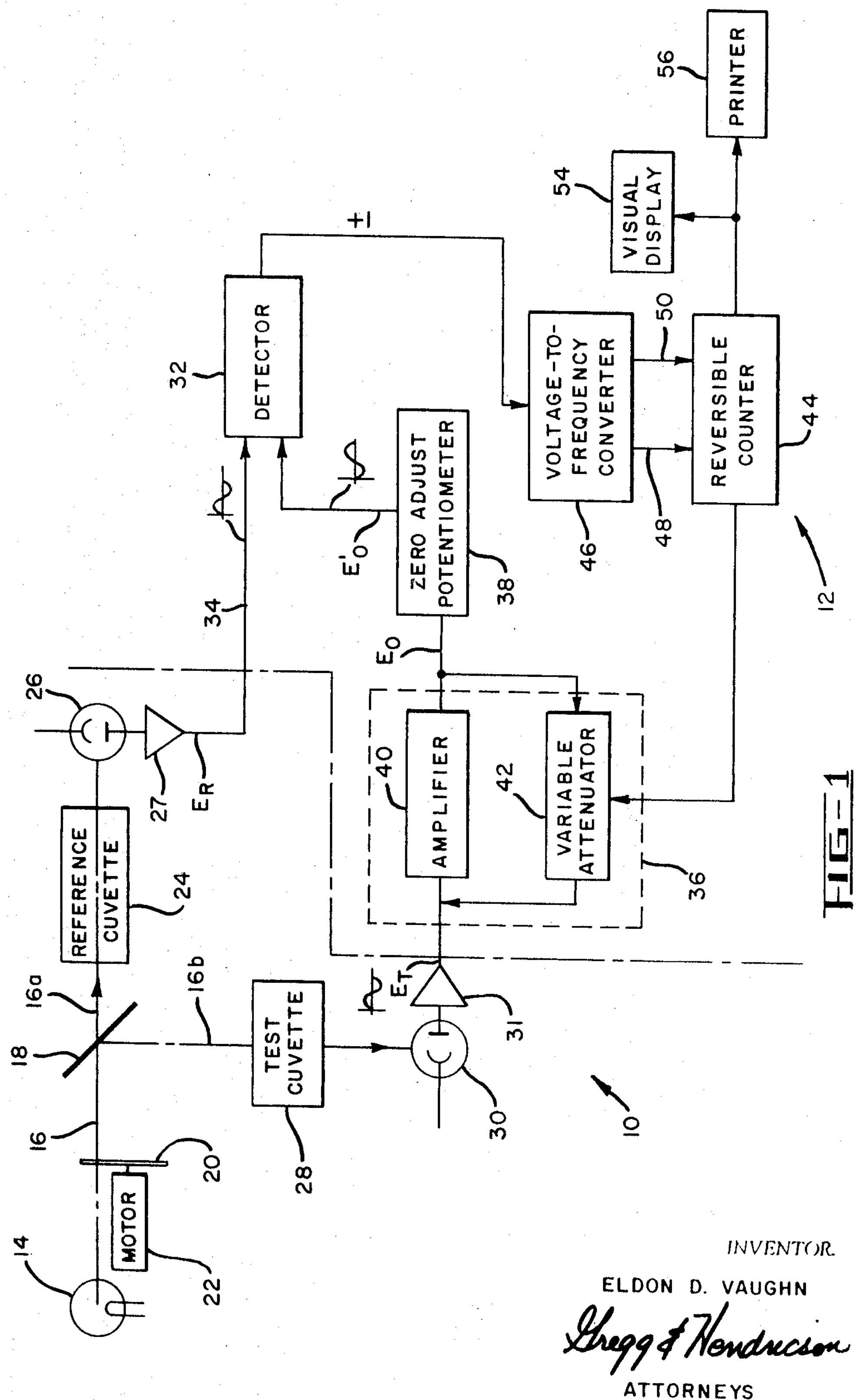

INVENTOR.
ELDON D. VAUGHN
Gregg & Henderson
ATTORNEYS

INVENTOR.
ELDON D. VAUGHN

Gregg & Henderson
ATTORNEYS

INVENTOR.
ELDON D. VAUGHN
Gregg & Henderson
ATTORNEYS (BEFORE SWITCHING)

FIG-4-A (AFTER SWITCHING)

INVENTOR.
ELDON D. VAUGHN

Gregg & Henderson
ATTORNEYS

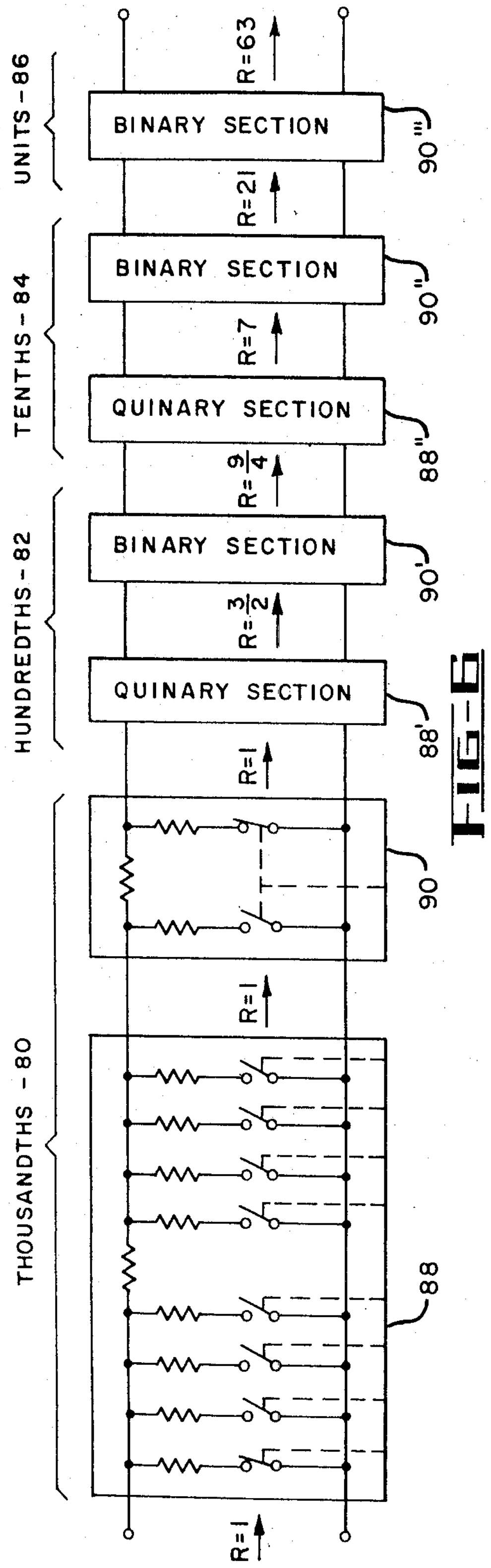
FIG-6
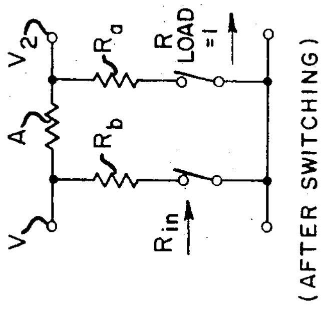
FIG-7-B
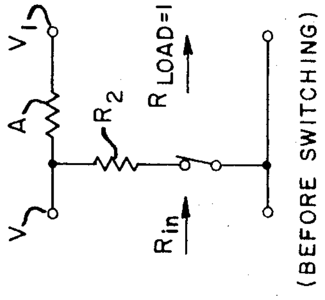
FIG-7-A
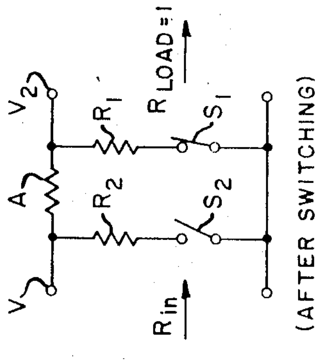
FIG-6-B
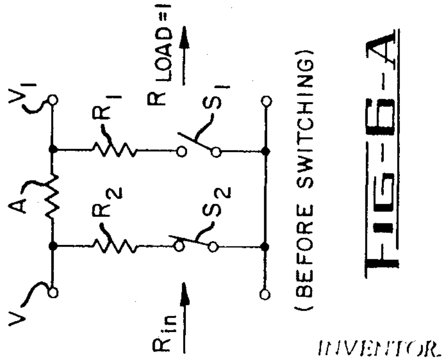
FIG-6-A
INVENTOR.
ELDON D. VAUGHN
Gregg & Hendricson
ATTORNEYS

VARIABLE ATTENUATOR

This application is a divisional application of U.S. Pat. application Ser. No. 595,528 filed Nov. 18, 1966 in the U.S. Patent Office and now abandoned.

The present invention may be best understood by first considering a practical application thereof although it is not intended to limit the invention to any single application. For example, the present invention may be employed in a logarithmic ratio measuring system useful in the field of spectrophotometry.

In a typical dual beam spectrophotometer separate beams of radiation such as light of a known wavelength are transmitted through a reference material and through a test material and impinge upon detectors such as photocells which provide analog voltage outputs proportional to the intensity of the beams leaving the reference and test materials, respectively. By Beer's Law it is known that the light transmission varies in a nonlinear, logarithmic, manner with the concentration of the substance in the test material. Thus, in a dual beam spectrophotometer, given equal incident light intensities and equal path lengths for the two cuvettes the logarithm of the ratio of the intensity of the beam from the reference material to the intensity of the beam from the test material is proportional to the concentration of the substance in the test material that is different from the reference material, which ratio is also a measure of the absorbance of that substance.

There may be provided apparatus which includes a null detector to which first and second signals, such as test and reference signals from the beam detectors of a spectrophotometer, are fed. The first signal is fed to the null detector through a variable gain means and the second signal is fed substantially directly thereto. The variable gain means includes an operational amplifier with a feedback loop comprising the variable attenuator of the present invention. The attenuator is varied exponentially in steps to provide the amplifier with an exponential gain which is the reciprocal of the exponential variation of the attenuator.

The output from the null detector is fed to a pulse producing means which, in turn, drives a reversible counter which is continuously responsive to pulses from the pulse producing means. The counter, in turn, sets the gain of the variable attenuator to provide for substantially equal signals to the null detector in such a manner that the state of the reversible counter is indicative of the logarithm of the ratio of the two input signals.

The variable attenuator of the present invention, as may be employed in the above-described system comprises a plurality of series resistors having one end connected to the output of the operational amplifier and the other end to the amplifier input. Each series resistor is provided with one or more pairs of shunt circuit paths, with one end of the path of each pair connected to opposite ends of a series resistor, and the opposite ends of the shunt circuit paths connected together. Each shunt path includes a series connected resistor and switch, which switches are operated by the output from the reversible counter. The attenuator and switching thereof are such that the attenuation is changed without changing the attenuator input impedance or the section input impedances, and no isolation amplifiers are required between the various attenuator sections.

Figure 3:
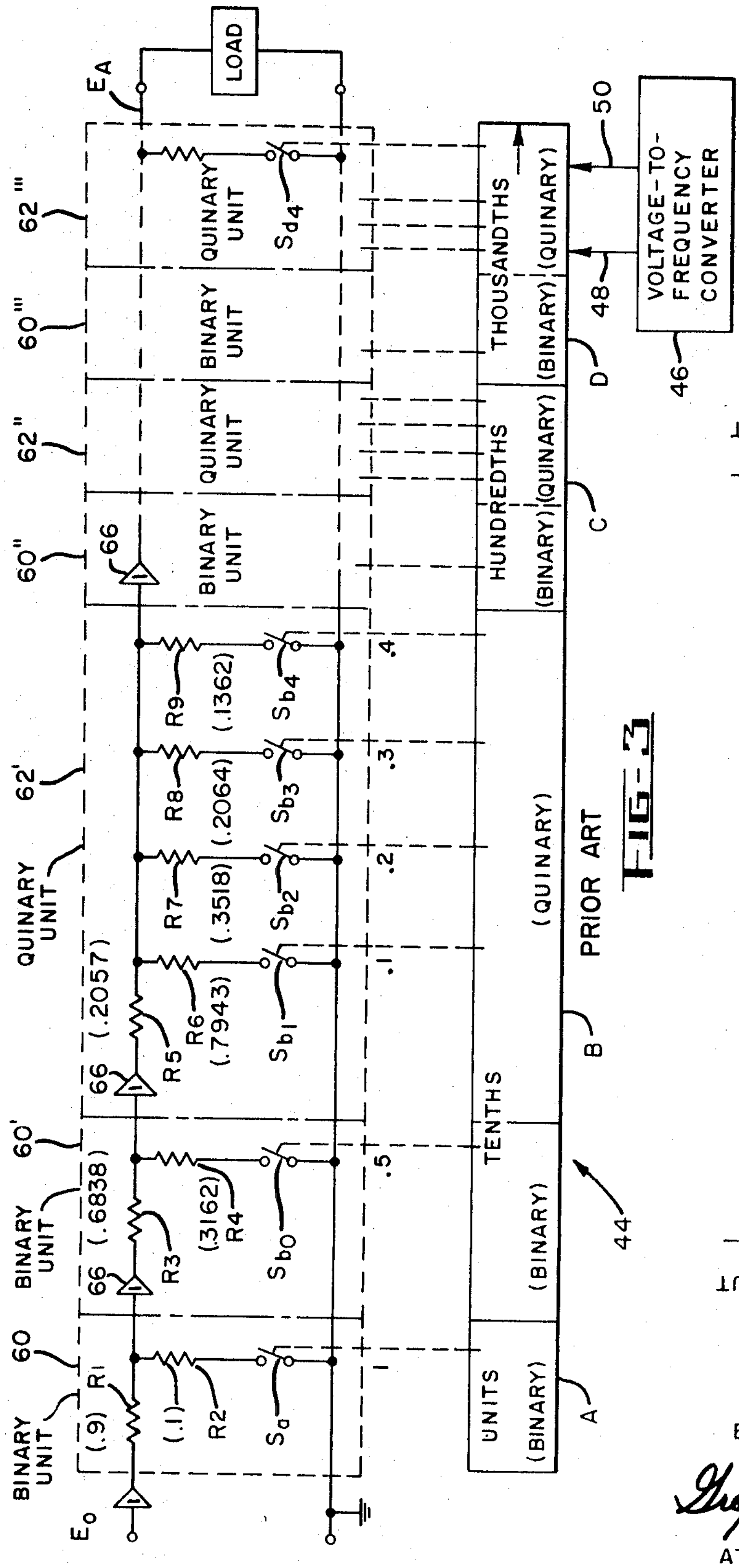
Figure 2:
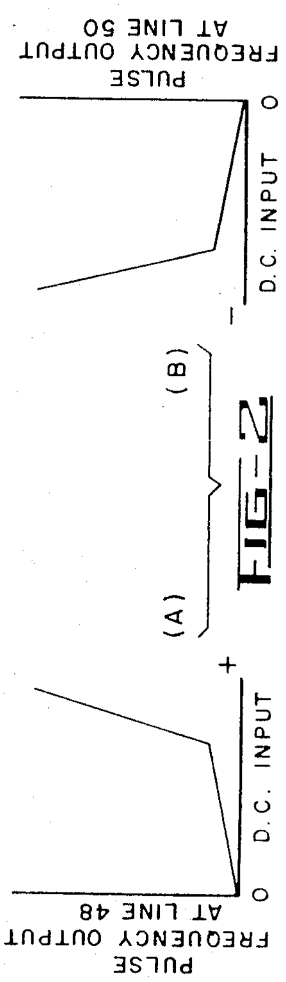
Figure 4:
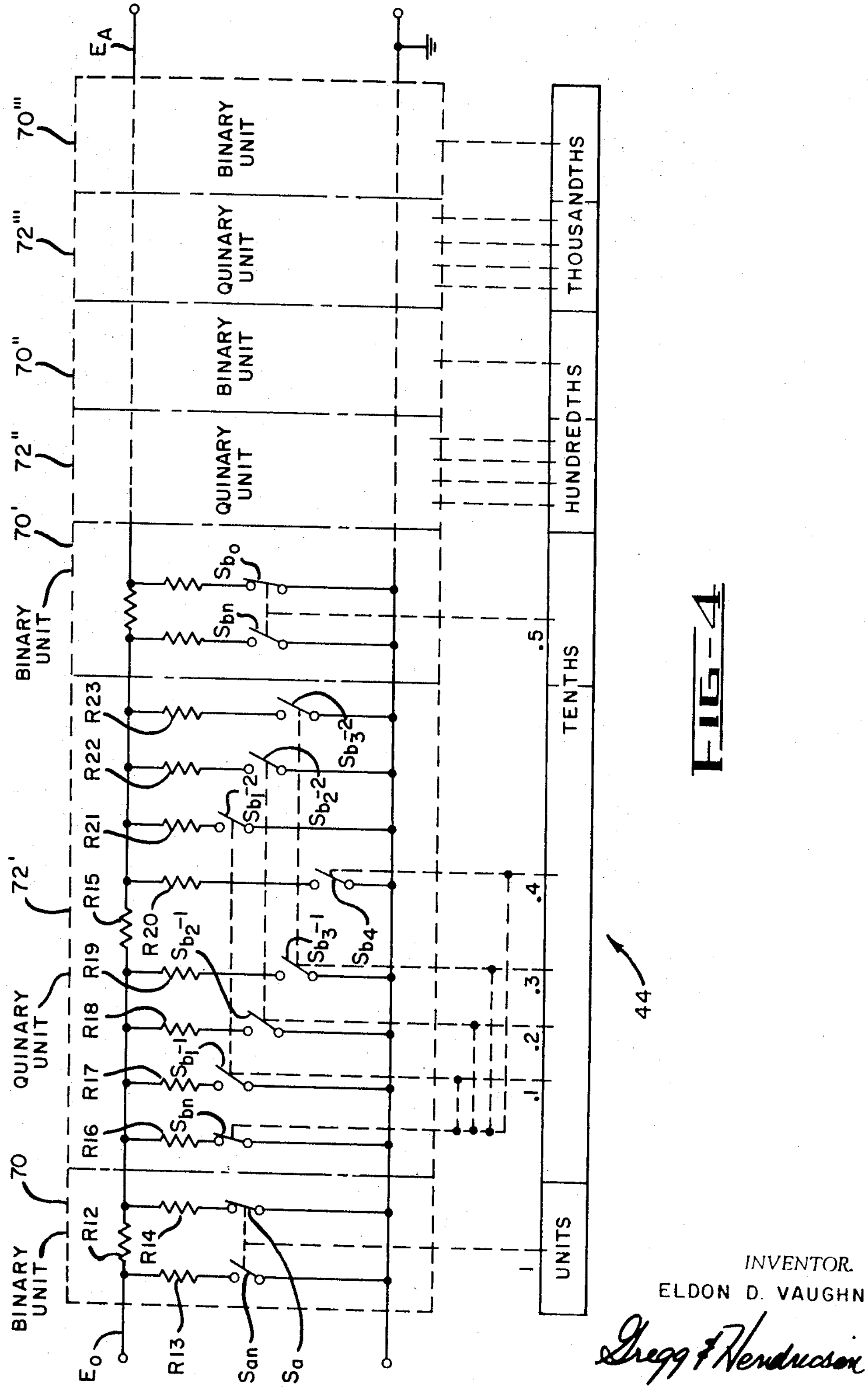
Figure 5:
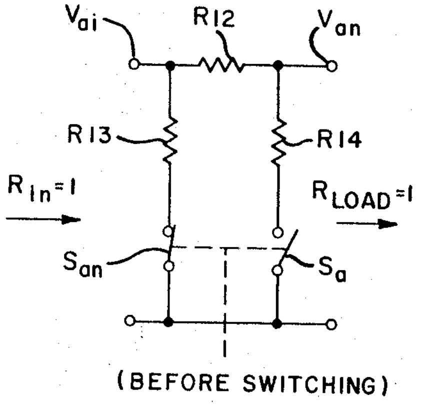
Figure 5:
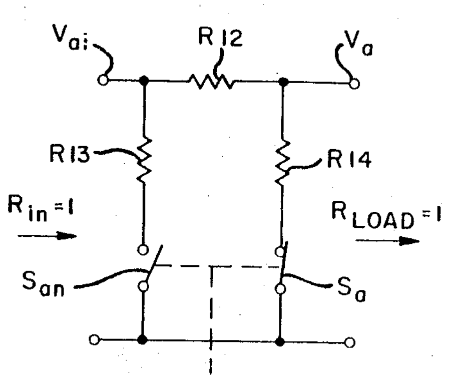
Figure 5:
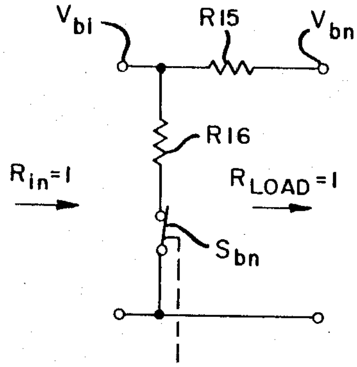
Figure 5:
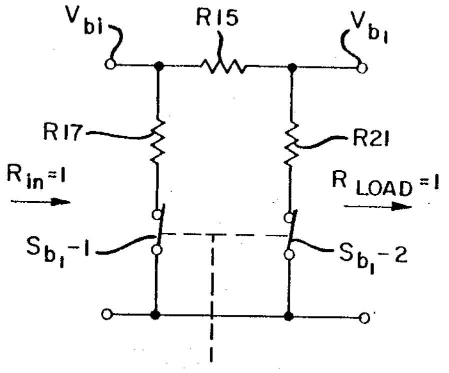
Figure 5:
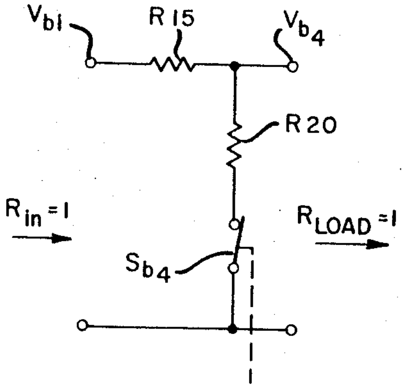
Figure 5:
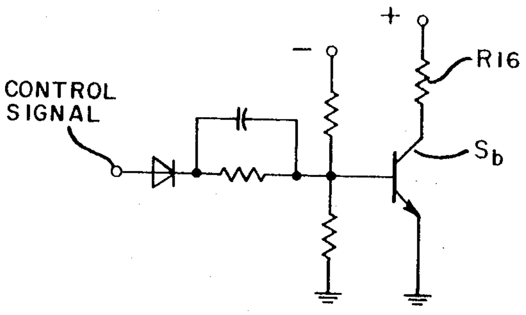

In the drawings, wherein like reference characters refer to the same parts in the several views, FIG. 1 is a simplified diagrammatic view of a spectrophotometer and a block diagram view of a converter including the attenuator of this invention connected to the output from the spectrophotometer, FIGS. 2A and 2B are graphs showing the relation between the input voltage and output frequency of the voltage-to-frequency converter employed in the system of FIG. 1, FIG. 3 is a combination schematic circuit and block diagram of a prior art type attenuator which may be used in the system of this invention, FIG. 4 is a combination schematic circuit and block diagram of the novel attenuator of this invention which may be used in the system of this invention, FIGS. 4A through 4E are schematic circuit diagrams of fragmentary portions of the attenuator shown in FIG. 4 and showing switches in various switch conditions, FIG. 5 is a schematic circuit diagram of a typical transistor switching circuit which may be used in switching the attenuator of this invention, FIG. 6 is similar to FIG. 4 but showing a modified form of attenuator embodying this invention, and FIGS. 6A, 6B, 7A and 7B are schematic circuit diagrams used to explain the operation of the attenuator of FIG. 6.

Reference is first made to FIG. 1 of the drawings wherein there is shown in simplified diagrammatic form a dual beam spectrophotometer 10 having analog signal outputs connected to the input of a logarithmic analog-to-digital converter 12 embodying this invention. The dual beam spectrophotometer which may be of conventional design is shown in greatly simplified form as comprising a monochromatic light source 14 from which a beam 16 of light is directed onto a semitransparent mirror 18 through a light chopping blade or shutter 20 driven by a motor 22. The light beam is split at the mirror 18 with a portion 16*a* of the beam passing through the mirror, thence through a cuvette 24, and onto a detector such as a photocell 26. Another portion 16*b* of the beam is reflected by the mirror 18 and is directed through a cuvette 28 onto a second detector such as the photocell 30.

The cuvette 24 carries the reference material, or solution, and the cuvette 28 carries the material to be tested. The outputs from the photocells 26 and 30 comprise analog audiofrequency signals proportional to the intensities of the beams entering the reference and test photocells 26 and 30, respectively. The signals from the photocells are in phase and are of the same audiofrequency dependent upon the rate of rotation of the light chopper blade 20. The photocell outputs are periodic signals with substantially equal harmonic content, however, for purposes of illustration and explanation, they are simply shown and referred to as sine waves. As mentioned above, dual beam spectrophotometers are well known and it will be understood that my novel ratio measuring apparatus is not limited for use with any particular type. Further, the ratio measuring apparatus is not limited to use with a spectrophotometer, but may be used wherever a measurement of the logarithm of the ratio of first and second electrical signals is required. Further, the input signals need not be limited to audiofrequency. Direct current and higher frequency analog input signals may be employed.

Continuing the description of FIG. 1, the reference analog signal from the photocell 26 is fed through an amplifier 27 to a detector 32 through line 34. The test analog signal from the photocell 30 is fed through an amplifier 31 and thence to the detector 32 through a variable gain means 36 and a manually controlled zero adjustment potentiometer 38, said potentiometer being necessary for compensation of unequal gain characteristics of the reference channel and the test channel due to differences in the beam splitting ratio differences in sensitivities of phototubes 26 and 30, and other gain differences.

The variable gain means 36 comprises an amplifier 40, such as an operational amplifier, or the like, with a feedback network which includes a variable gain attenuator 42. The gain of the attenuator is varied in steps under control of a reversible counter 44, and by well-known feedback theory the amplifier 40 is responsive to the reciprocal of the feedback function. With this invention the gain of the attenuator 42 is varied exponentially in a manner to provide the amplifier 40 with an exponential gain characteristic which is the reciprocal of the attenuator gain characteristic.

The reference signal $E_R$ from the photocell 26 is in phase with the test signal $E_T$ from the photocell 30, and the test signal is inverted by the illustrated operational amplifier 40 whereby the signals fed to the detector means 32 are 180° out of phase. The detector means 32 is effective to provide a DC output having a magnitude dependent upon the difference in amplitude between the reference and test signals fed thereto and a polarity dependent upon which of said input signals is of greater magnitude. Any phase sensitive null detector of a well-known type may be employed. Also, a product detector of any well-known type which provides an output indicative of the product of the two input signals and having a polarity dependent upon which signal is largest may be used. The function of the detector 32 is to sense whether there is a difference in magnitude between the input signals thereto and to provide an output having a polarity dependent upon which signal is the largest and a magnitude dependent upon the difference in amplitude of the signals. In one arrangement which has been built and tested a positive DC voltage is obtained from the null detector when the reference signal input exceeds the test signal input, and a negative DC voltage is obtained when the test signal exceeds the reference signal. When the test and reference signal inputs are equal the output from the null detector is zero.

The output from the null detector is fed to a voltage-to-frequency converter 46 for conversion to pulses. Voltage-to-frequency converters are well known and require no detailed description. The illustrated voltage-to-frequency converter has two output lines designated 48 and 50 which are connected to the reversible counter 44 to provide forward and reverse drive pulses to the counter. With a positive DC input to the voltage-to-frequency converter a pulse output is provided at line 48 for forward drive of the counter, and with a negative DC input to the converter a pulse output is provided at line 50 for reverse drive of the counter. With a zero input signal to the converter 46 no pulse output is provided. The counter adds a count of "one" for every pulse received through line 48 and subtracts a count of "one" for every pulse received through line 50. To reduce overshooting, it is desirable that the repetition rate of the output pulses from the voltage-to-frequency converter 46 vary in accordance with the magnitude of the input signal thereto from the detector means 32. A graph of the voltage-to-frequency converter characteristic is shown in FIGS. 2A and 2B. The converter may simply comprise a pair of voltage-to-frequency converter units in parallel, one of which is responsive to negative DC error signals and the other of which is responsive to positive DC error signals. Voltage-to-frequency converters are well known and no further description thereof is required.

As mentioned above, the reversible counter 44 is driven in a forward direction with input pulses from line 48 and in a reverse direction with input pulses from line 50. Reversible counters are well known and require no detailed description. The counter may be of any well-known type such as binary digital, quinary-binary digital, or the like. A novel variable attenuator 42 which is operated by the output from a quinary-binary digital counter is disclosed in detail hereinbelow, and when such an attenuator is employed a quinary-binary digital counter is used to drive the same.

The output from the counter 44 provides a plurality of signals for selectively actuating the variable attenuator 42 in accordance with the setting of the counter. The attenuator 42, as mentioned above, is included in the feedback loop of the operational amplifier 40 for controlling the gain thereof. The attenuator is set to adjust the gain of the amplifier 40 so that the signal $E'_O$ balances the reference signal $E_R$ at the input to the null detector 32.

The variable amplifier means 36 has an exponential gain characteristic such that 1. $E'_O=Km^PE_T$ wherein:

$E'_o$ = the output from the Zero Adjust Potentiometer 38,
$E_T$ = the test signal input to the amplifier means 36,
$m$ = the desired logarithmic base,
$p$ = the state of the storage or counter 44, and
$k$ = the gain of the Zero Adjust Potentiometer 38.

When the system is at balance the two inputs $E_R$ and $E'_O$ to the null detector 32 are equal. That is for $E'_{OB}=E'_O)_{\text{At balance}}$

2. $E_R=E'_{OB}$

Substituting equation (1) into equation (2),

3. $E_R=Km^{P_B}E_T$ where $$P_B=P)_{\text{At balance}}$$

or

4. $$\frac{E_R}{KE_T}=m^{P_B}$$

or

5. $$P_B=\log_m\frac{E_R}{E_T}-\log_m K$$

The analog voltages $E_R$ and $E_T$ are proportional to the intensity of the reference and test beams 16a and 16b striking the photocells 26 and 30, respectively. However, as stated above, even with identical material in each cuvette, the intensity of light leaving the test cuvette 28 may not be the same as the intensity of light leaving the reference cuvette 24.

Defining the quantities $I_R$ and $I_T$ as the intensities of light that would be transmitted through the reference cuvette 24 and the test cuvette 28 respectively, given equal incident light intensities and identical cuvette characteristics, we have that 6. $E_R=C_RI_R$ where $C_R$ is some constant, and
7. $E_T=C_TI_T$ where $C_T$ is also a constant.

Substituting equations (6) and (7) equation (5) becomes,

8. $$P_B=\log_m\frac{C_RI_R}{C_TI_T}-\log_m K,\text{ or}$$

9. $$P_B=\log_m\frac{I_R}{I_T}+\log_m\frac{C_R}{C_T}-\log_m K$$

Proper adjustment of $K$ to equal the ratio $C_R/C_T$ yields the desired results that

(10) $$P_{BZ}=\log_m\frac{I_R}{I_T}=P_B\Big)_{\text{For zero adjustment, }K=\frac{C_R}{C_T}}$$

Finally for $m=10$

(11) $$P_{BZ})_{m=10}=\text{Absorbance of the test material.}$$

From Beer's Law discussed above, the concentration of substance in the test cuvette 28 is proportional to the logarithm of the ratio of the intensities of the beams from the reference and test cuvettes 24 and 28, respectively as defined above. As mentioned above, the absorbance of the test material is directly proportional to its concentration in solution. Consequently it will be seen that $P_{BZ}$ is an expression directly proportional to the concentration of the substance under test.

The variable gain means 36 may be of the type shown in Pat. No. 3,264,637, issued Aug. 2, 1966 by G. B. Parkinson. There, an antilogarithmic digital-to-analog converter is shown which is responsive to selection signals from a binary digital register, which converter is of the type which could be used for the variable gain means 36. In the Parkinson patent the register is of the binary digital type, and a reversible binary digital type counter 44 would be used in the system shown in FIG. 1 if the antilogarithmic digital-to-analog converter of Parkinson were employed as the variable gain means 36.

As described above, at balance, $P_{BZ}$ the number in the reversible counter 44 after proper zero adjustment of the potentiometer 38, is equal to the logarithm of the ratio of $I_R$ to $I_T$, which is the desired output of the device. The output from the counter 44 may be decoded and supplied to readout means such as a visual display device 54 and printer 56 for a permanent tape record. The visual display means may operate continuously for a continuous display of the output and the printer may be operated intermittently or periodically when the system is balanced. Readout means are well known and require no detailed description or illustration.

As an example of a method of using the apparatus, the reference and test cuvettes 24 and 28 are either left empty or are supplied with identical liquids, and the zero adjust attenuator 38 is manually adjusted to provide a desired counter setting, such as zero count. The sample material together with any required reagent is then added to the test cuvette 28 and is permitted to incubate, if necessary. A color change is produced in the material in the test cuvette to produce a change in intensity of the light beam striking the detector 30 and the output therefrom. The apparatus then functions automatically to return the system to a balance condition whereby the state of the reversible counter is representative of the concentration of the material in the test cuvette.

As described above, the state of the reversible counter 44 at balance is proportional to the absorbance of the material in the test cuvette. In one arrangement a counter with a range from 0.000 to 1.999 has been employed with an attenuator $m=10$ to indicate absorbance over the range $-0.100$ to 1.899. The shift of $-0.100$ from the storage to the readout is accomplished in the decoding and is needed to allow for drift and testing for absorbance of materials in which the intensity of the beam striking the photocell 30 increases, rather than decreases, when the sample material is added to the test cuvette 28.

Given equation (1), the gain of the attenuator 42 is $(1/m)^P$ where $m$ is the logarithmic base and $P$ is the state of the counter 44. The apparatus may be constructed for use with any desired logarithmic base, and where the logarithm to the base 10 is used, then:

12. $\text{gain}=(0.1)^P$

To obtain a digital expansion of $P$ between 0.000 to 1.999, let

13. $$P=a+\frac{1}{10}b+\frac{1}{100}c+\frac{1}{1000}d$$

where:

14. $b=5b_o+b_1+2b_2{}^3b_3+b_4$

15. $c=5c_o+c_1+2c_2{}^3c_3+c_4$

16. $d=5d_o+d_1+2d_2{}^3d_3+d_4$ and wherein:

$$a=0 \text{ or } 1;$$
$$b_o=\text{or } 1;$$
$$\sum_{i=1}^{4} b_i=\text{or } 1; \text{ for } i=1 \text{ to } 4.$$
$$\Sigma b_i{}^0 \text{ or } 1;$$
$$c_o=\text{or } 1;$$
$$\sum_{i=1}^{4} c_i=\text{or } 1; \text{ for } i=1 \text{ to } 4.$$
$$\Sigma c_i{}^0 \text{ or } 1;$$
$$d_0=0 \text{ or } 1;$$
$$\sum_{i=1}^{4} d_i=0 \text{ or } 1; \text{ for } i=1 \text{ to } 4.$$
$$\Sigma d_1{}^0 \text{ or } 1.$$

Rewriting equation (13) by substituting equations (14), (15) and (16) therein:

(17)

$$P=a+\frac{1}{10}(5b_0+b_1+2b_2+3b_3+4b_4)+\frac{1}{100}(5c_0+c_1+2c_2+3c_3+4c_4)+\frac{1}{1000}(5d_0+d_1+2d_2+3d_3+4d_4)$$

or (18)

$$P=a+\frac{1}{2}b_0+\frac{1}{10}b_1+\frac{1}{5}b_2+\frac{3}{10}b_3+\frac{2}{5}b_4+\frac{1}{20}c_0+\frac{1}{100}c_1+\frac{1}{50}c_2+\frac{3}{100}c_3+\frac{1}{25}c_4+\frac{1}{200}d_0+\frac{1}{1000}d_1+\frac{1}{500}d_2+\frac{3}{1000}d_3+\frac{1}{250}d_4$$

Substituting the expression of P given in equation (18) into the attenuator gain equation (12)

$$\text{gain}=(.1)^P=(.1)^{\left[a+\frac{5}{10}b_0+\cdots\right]}$$

or (19)

$$\text{gain}=(.1)^a(.1)^{\frac{1}{2}b_0}(.1)^{\frac{1}{10}b_1}(.1)^{\frac{1}{5}b_2}(.1)^{\frac{3}{10}b_3}(.1)^{\frac{2}{5}b_4}(.1)^{\frac{1}{20}c_0}(.1)^{\frac{1}{100}c_1}(.1)^{\frac{1}{50}c_2}(.1)^{\frac{3}{100}c_3}(.1)^{\frac{1}{25}c_4}(.1)^{\frac{1}{200}d_0}(.1)^{\frac{1}{1000}d_1}(.1)^{\frac{1}{500}d_2}(.1)^{\frac{3}{1000}d_3}(.1)^{\frac{1}{250}d_4}$$

or (20)

$$\text{gain}=(.1)^a(.3162)^{b_0}(.7943)^{b_1}(.6310)^{b_2}(.5012)^{b_3}(.3981)^{b_4}(.8913)^{c_0}(.9772)^{c_1}(.9550)^{c_2}(.9333)^{c_3}(.9120)^{c_4}(.9885)^{d_0}(.9977)^{d_1}(.9954)^{d_2}(.9931)^{d_3}(.9908)^{d_4}$$

An attenuator which provides the gain characteristic indicated by equation (20) is shown in FIG. 3. There, a plurality of serially connected binary units 60, 60', 60'' and 60''' and quinary units 62', 62'' and 62''' are shown, which units are adapted for actuation by the output from a quinary-binary digital type counter 44. As mentioned above, the exponents $a$, $b_o$, $b_1$ ... thru $d_4$ in equation (20) are either "0" or "1" for multiplication by a factor of "1" or by the number within the parenthesis. In FIG. 3 the multiplication factors are selected by switches $Sa$, $Sb_o$, $Sb_1$ ... $Sd_4$. The "units" section A of the counter simply comprises a binary stage switchable between 0 and 1 states for control of switch $Sa$. Switch $Sa$ and all of the other switches included in the attenuator may comprise transistors, but for simplicity are shown as single-pole, single-throw switches. With switch $Sa$ open yielding an exponent $a=0$, the gain of the section 60 is unity; and with the switch closed thus yielding $a=1$, and the gain is $$\frac{.1}{.9+.1}=.1$$

The "10ths" section of the counter comprises a quinary-binary decade unit B for control of the quinary and binary section 62' and 60', respectively, of the attenuator. The sections 60'' and 62'', and 60''' and 62''' are similar to the sections 60' and 62', respectively, and need not be shown or described in detail. From equation (20) it will be seen that the gain of binary section 60' is unity when the switch $Sb_0$ is open yielding $b_o=0$ and 0.3162 when the switch is closed yielding $b_o=1$. The value of the resistors R5 through R9 in the quinary section 62' (only one of which is switched into the circuit at any given time) are chosen to provide the desired multiplication factor as indicated by equation (20).

With the arrangement shown in FIG. 3 the individual sections of the attenuator must be isolated as by unity gain infinite input impedance, zero output impedance isolation amplifiers because of the change in input impedance of the sections with the change of state of the switches $Sa$, $Sb_o$, $Sb_1$, etc. The use of a large number of amplifiers 66 adds considerably to the cost of the attenuator and presents problems of adjustment and stability. Other types of attenuators are known which may be used in the apparatus of this invention, which attenuators have a substantially constant input impedance and which do not require a large number of isolation amplifiers. An example, of an attenuator which does not require a large number of isolation amplifiers and which has a constant input impedance is contained in Pat. No. 3,273,143 issued Sept. 13, 1966 to P. D. Wasserman. However, a major disadvantage of this type of attenuator is that the switching elements for switching various resistors are not connected to a common constant potential terminal, such as ground. Instead, the terminals of the switching elements are connected to varying voltage points, thereby precluding the use of transistor switches.

A novel variable gain attenuator which does not have the shortcomings of such prior art attenuators and which may be used in the converter of this invention is shown in FIG. 4 to which reference is now made. The attenuator is shown comprising a plurality of serially connected quinary and binary sections or units 70, 70', 72', 70'', 72'', 70''', and 72''', each of which sections are actuated by the output from the quinary-binary digital type counter 44. As described above, the exponents $a$, $b_o$, $b_1$ ... $d_4$ in equation (20) are either "0" or "1"

for multiplication by a factor of 1 or by the number within the parenthesis. In FIG. 4 the multiplication factors are selected by switches *San*, *Sbn*, $Sb_1$–1, $Sb_1$–2, etc.

The attenuator sections 70, 72', 70', etc., each comprise a pi network with a series resistance branch and shunt-connected resistance branches. All of the binary sections are of the same configuration so a description of the one binary section will suffice. The binary section 70 simply comprises a series resistor element 12 and a pair of shunt resistance branches at opposite ends thereof, each of which shunt branches comprises a series connected resistor and switch (R13, *San* and R14, *Sa*). The switches *San* and *Sa* are operated in a manner for switching one or the other shunt leg resistor into the section. In practice the switches comprise transistors, or the like, which are operated in a complementary fashion, i.e., when one is conducting the other is cut off. In accordance with this invention each section of the attenuator has a substantially constant input resistance for all switch conditions of the section whereby the switching of one section responsive to the setting of the associated section of the counter does not affect the loading on the preceding section. For simplicity an attenuator in which each section has the same input resistance will be described. However, the sections may have different input resistances so long as the input resistance for any one section remains constant.

For convenience the one pi section 70 is redrawn in FIGS. 4A and 4B to show the associated switches in first and second operative conditions wherein the gain is $1/1+R12$ and $0.3162/(1+R12)$, respectively. For constant input resistance for the section in the first and second operative conditions:

$$(21)\qquad R_{in}=R12+\left(\frac{R14R_{load}}{R14+R_{load}}\right)_{\substack{San=open\\Sa=closed}}$$

$$(22)\qquad R_{in}=\left(\frac{R13(R_{load}+R12)}{R_{load}+R13+R12}\right)_{\substack{San=closed\\Sa=open}}$$

For $R_{in}=R_{load}=1$, equations (21) and (22) become:

$$(23)\qquad R_{in}=R12+\left(\frac{R14}{R14+1}\right)=\frac{R13(1+R12)}{1+R13+R12}=1$$

From equation (20) it will be understood that the ratio of the gain of the binary section 70 when *San* is open and *Sa* is closed, to the gain when *San* is closed and *Sa* is open is 0.3162 to 1. The voltage input to the section 70 is designated *Vai* in FIGS. 4A and 4B. Also, the output voltage is designated *Van* with switch *San* closed and *Sa* open, and is designated *Va* with switch *San* open and *Sa* closed. Consequently:

$$(24)\qquad \frac{Van}{Vai}=\frac{1}{1+R12}$$

and $$(25)\qquad Van=\frac{Vai}{1+R12}$$

Also, $$(26)\qquad \frac{Va}{Vai}=\frac{R_{in}-R12}{R_{in}}=1-R12$$

27. $Va=Vai(1-R12)$

The ratio of *Va*/*Van* from equations (25) and (27) is $$(28)\qquad \frac{Va}{Van}=\frac{(1-R12)Vai}{\frac{Vai}{1+R12}}$$

Finally,

29. $Va/Van=1-R12^2$

From equation (23)

30. $R12+R14/(R14+1)=$ and, rearranging,

31. $R14=(1-R12)/R12$

Rearranging equation (29) and solving for *R*12, $$(32)\qquad R12=\sqrt{1-\frac{Va}{Van}}$$

Also from equation (23)

$$(33)\qquad \frac{R13(1+R12)}{1+R13+R12}=1$$

Rearranging and solving for *R*13,

34. $R13=(1+R12)/R12$ substituting equation (32) into equation (34), $$(35)\qquad R13=\frac{1+\sqrt{1-\frac{Va}{Van}}}{\sqrt{1-\frac{Va}{Van}}}$$

To solve for *R*14 in terms of *Va*/*Van* substitute equation (32) into equation (31)

$$(36)\qquad R14=\frac{1-R12}{R12}=\frac{1-\sqrt{1-\frac{Va}{Van}}}{\sqrt{1-\frac{Va}{Van}}}$$

In equations (32), (35) and (36) the values of the resistors *R*12, *R*13 and *R*14 in the binary sections of the attenuator are expressed in terms of the gain *Va*/*Van* of the sections for the situation where the input and load resistances are equal and the load resistance is equal to one. The gain for each of the attenuator sections is provided by equation (20) and by substituting values indicated therein for the gain, *Va*/*Van*, in equations (32), (35) and (36) the relative resistance values are obtained.

As mentioned above, the quinary sections include a series resistor R15 and a plurality of shunt circuit paths, which include resistors R16 through R23, one or two of which shunt legs are switched into the circuit at any one time. When two shunt resistors are operative, they are included at opposite ends of the series resistor R15. Similar design techniques for determining the resistance values of the resistors in the binary units are employed in determining the resistance values of the quinary section resistors. In FIGS. 4C, 4D and 4E portions of the quinary section are shown with the associated switches in different operative conditions; the "before switching" condition being shown in FIG. 4C, and "after switching" conditions being shown in FIGS. 4D and 4E. In FIG. 4D the shunt resistors R17 and R21 are shown switched into the circuit. Similarly, R18 and R22 or R19 and R23 may be switched into the circuit in place of R17 and R21. The FIG. 4E condition wherein R20 is included in one shunt path is seen to be a special case of the condition shown in FIG. 4D where the resistance R17 in one shunt path is infinite. Without substantially repeating the above derivation, it can be shown that, $$(37)\qquad R16=\frac{1+R15}{R15}$$

$$(38)\qquad R21=\frac{R15\frac{Vb_1}{Vbn}}{\left(1-\frac{Vb_1}{Vbn}\right)(1+R15)}$$

$$(39)\qquad R17=\frac{(1+R15)\left(R21+\frac{R15}{1+R15}\right)}{R15\left(R21-\frac{1-R15}{R15}\right)}$$

for the situation where the input and load resistances are equal for the "before" and "after" switching conditions, and the load resistance is equal to unity.

The expressions for *R*18 and *R*19 are similar to that for *R*17, and the expressions for *R*22 and *R*23 are similar to that for *R*21 above. $Vb_1/Vbn$, $Vb_2/Vbn$, $Vb_3/Vbn$, and $Vb_4/Vbn$ are four different values corresponding to each $b_i=1$, $i=1, 2, 3$, or 4 (the three conditions wherein a pi section is formed as illustrated in FIG. 4D, and the one condition wherein a half-pi section is formed, illustrated in FIG. 4E).

The value of R15 is determined by the smallest ratio, namely $Vb_4/Vbn$, which in the illustrated arrangement is, 40. $Vb_4/Vbn=(0.1)^{.4}=0.3981$ The case where the input shunt resistance is infinite (namely the half-pi section illustrated in FIG. 4E) is chosen, and from equation (39) the parallel equation defining $R20$ is, $$(41)\qquad \infty=\frac{(1+R15)\left(R20+\frac{R15}{1+R15}\right)}{R15\left(R20-\frac{1-R15}{R15}\right)}$$

The denominator of the right-hand side of equation (41) must be zero, and since $R15 \neq 0$, $$(42)\qquad \left(R20=\frac{1-R15}{R15}\right)=0$$

therefore, $$(43)\qquad R20=\frac{1-R15}{R15}$$

The parallel equation to equation (38) which defines $R20$ is, $$(44)\qquad R20=\frac{R15\left(\frac{Vb_4}{Vbn}\right)}{\left(1-\frac{Vb_4}{Vbn}\right)(1+R15)}$$

Equating expressions (44) and (43), $$(45)\qquad \frac{R15\frac{Vb_4}{Vbn}}{\left(1-\frac{Vb_4}{Vbn}\right)(1+R15)}=\frac{1-R15}{R15}$$

Solving equation (45) for $R15$, $$(46)\qquad R15=+\sqrt{1-\frac{Vb_4}{Vbn}}$$

The value of $Vb_4/Vbn$ is known from above to be 0.3981 whereby, $$(47)\qquad R15=\sqrt{1-.3981}=.7758$$

Substituting this value of $R15$ into equation (43), the value of $R20$ is found, $$(48)\qquad R20=\frac{1-.7758}{.7758}=.2890$$

Similarly, substituting this value of $R15$ into equation (37) the value of $R16$ is found as:

$$(49)\qquad R16=\frac{1+.7758}{.7758}=2.289$$

$R21$, as calculated from equations (39) and (38) using $Vb_1/Vbn(0.1)^{\cdot 1}=0.7943$ are 3.478 and 1.687, respectively. The values of the other resistors R18 and R22 and R19 and R23 are calculated in a similar manner using parallel equations to equations (39) and (38) with the proper gain ratio, namely $Vb_2/Vbn$ and $Vb_3/Vbn$ respectively. The value of resistors employed in the other binary and quinary sections of the attenuator are calculated in the manner described above. It will be recalled that the resistance values stated above are based upon an input resistance of unity. In practice an attenuator having a characteristic impedance of about $10^5$ ohms is used.

Also, in practice, the switches $Sbn$, $Sb_1$-1, $Sb_2$-1, etc., comprise transistors which are switched between "on" and "off" conditions by signals derived from the reversible counter 44 through a suitable switching network. In FIG. 5, one such transistor switch $Sb'$ is shown for switching resistor R16 into and out of the ladder. With this novel resistance ladder, not only is a constant input resistance provided for each section of the ladder for all switch conditions, but the switching of the shunt resistors is to ground. Consequently, one transistor terminal is grounded, and the application of a control signal for "on" and "off" switching is simply accomplished.

Transistors, such as silicon transistors can be found that have an "off" condition resistance of thousands of megohms, and an "on" condition resistance of about 5 to 10 ohms. For accuracy, precision resistors are employed in the ladder. The size of the largest resistor employed is limited by the availability and cost of high resistance precision resistors, and the smallest resistance value, then depends upon the largest resistor employed. With the attenuator of FIG. 4, if the largest resistor (which is included in the thousandth's quinary unit 72''' of the attenuator) has a value of 4.57 megohms, the smallest resistor (which is included in the binary unit 70) has a resistance of 5.41 kohms.

With a switch resistance of about 5 ohms, for example, it will be seen that this resistance is approximately 0.1 percent of the small resistance value. For precision operation the switch resistance must be included in the calculation for the shunt leg resistance values, at least for the small resistance branches in which the switch resistance is a significant part of the total branch resistance.

It will be apparent that if the ratio of the largest resistance to the smallest resistance can be reduced, the value of the smallest resistance can be increased; thereby decreasing the affect of the switch resistance. This is accomplished by use of a modified form of ladder such as shown in FIG. 6. Referring to FIG. 6 there is shown a ladder comprising a plurality of cascaded thousandth's, hundredth's, and tenth's Section pairs and a Unit's Section 80, 82, 84 and 86, respectively. The section pairs 80, 82 and 84 each comprise a quinary section and a binary section and the section 86 simply comprises a binary section, the quinary sections being designated 88, 88' and 88'', and the binary sections being designated 90, 90' and 90'' and 90'''. The circuit arrangement of resistors and switches in the various units is identical with that shown in FIG. 4 and requires no additional description. However, the resistance values are different for some of the units. In particular, the resistance values are such that some of the sections have a resistance change between the input and the load of the section. In the arrangement shown in FIG. 4, each section has the same input and load resistance, and the input resistance of each section is the same as the load resistance of the preceding section. In the modified arrangement shown in FIG. 6, sections of the attenuator have a higher load resistance than input resistance, but the input resistance of each section is equal to the design load resistance of the section immediately preceding the same. By way of example only, in FIG. 6 the sections 88 and 90 are shown with the same input and design load resistance, designated $R=1$. The section 88' has a design load resistance which is 3/2 of the input resistance; the section 90' has an input resistance of 3/2 and a design load resistance of 9/4; the section 88'' has an input resistance of 9/4 and a design load resistance of 7; the section 90'' has an input resistance of 7 and a design load resistance of 21; and the section 90''' has an input resistance of 21 and a design load resistance of 63. It will be apparent that the above resistance values are relative and not absolute values.

In FIGS. 6A and 6B a typical binary section is shown in the "before" and "after" switching conditions. $R_{in}$ designates the input resistance, $R_{load}$ the load resistance, V the input voltage, V1 the output voltage before switching, V2 the output voltage after switching, R1 and R2 the shunt resistors of the pi network, and A the series resistor. From these figures it can be shown that for $R_{load}=1$, $$(50)\qquad A=\frac{(R_{in}-1)+\sqrt{R_{in}^2+(2-4X)R_{in}+1}}{2}$$

where: $X=V2/V1$ $$(51)\qquad R1=\frac{R_{in}-A}{1-(R_{in}-A)}$$

and $$(52)\qquad R2=\frac{(1+A)R_{in}}{1+A-R_{in}}$$

From equations (50), (51) and (52) families of curves of $A$ vs. $R_{in}$ with $V2/V1$, $R1$ and $R2$ allowed to vary in a discrete manner can be plotted, which curves can be used to obtain a graphical near optimum solution using as criteria that insertion loss must be low and the ratio of the largest resistor to smallest resistor must be as small as practical. Insertion loss is defined as the attenuation across a section in its normal state, i.e.,

53. $I.L.=V/V_1=1$

For ease in calculating the required resistance values, the lowest attenuation section (the thousandths section 80) is located at the input to the ladder and the highest attenuation section (the unit's section 86) is last. (With the attenuator shown in FIG. 4 the sections are arranged in any desired order since the input and output resistances of all the sections are equal.) As a further guide in the design of the sections, a plot of $A$ vs. $R1/R_{in}$ for values of X and the resistance Stepup ($T_Z$) from input to load may be made, from which suitable values of $T_Z$ for each section may be selected such that $A$ is small, $R1/R_{in}$ is satisfactory, and a suitable balance is provided between the input resistance to the ladder and the final terminating resistor. The value of $A$, $R1$ and $R2$ are calculated from equations (50), (51) and (52).

Values of the resistors employed in the quinary sections are obtained in a manner similar to that described above using the above-mentioned plots. In FIGS. 7A and 7B "before" and "after" switching conditions are shown for a typical quinary section for which it can be seen that:

(54)

$$Ra=\frac{A\frac{V2}{V1}}{(1+A)(1-X)}$$

and (55)

$$Rb=\frac{Ra+A(1+Ra)}{Ra+(A-R_{in})(1+Ra)}R_{in}$$

Utilizing the attenuator ladder shown in FIG. 6 the ratio of largest to smallest shunt resistor is reduced to about 56.8. Therefore, if the largest shunt resistor has a value of about 4.57 megohms the smallest will have a value of about 80.46 Kohms. A switch resistance of 5 ohms comprises less than 0.006 percent of this lowest value shunt resistor which is insignificant and can be ignored in the calculations. This of course, is an improvement over the ladder of FIG. 4 wherein the switch resistance must be included in the calculation of lower resistance shunt legs. In addition, the insertion loss of the ladder shown in FIG. 6 is less than that of the ladder shown in FIG. 4. A typical insertion loss for the ladder of FIG. 6 is approximately 3.1 whereas the insertion loss for the ladder shown in FIG. 4 is 13.25. A lower insertion loss is of obvious advantage.

The invention having been described in detail in accordance with the requirements of the Pat. Statues, various other changes and modifications may suggest themselves to those skilled in this art, and it is intended that such changes and modification shall fall within the spirit and scope of the invention as defined in the appended claims.

I claim:

1. A digitally controlled attenuator having an input terminal and a common terminal adapted for connection across an analog signal source, and an output terminal, a plurality of series connected resistors with one end connected to the input terminal and the other end connected to the output terminal, a plurality of pairs of shunt circuit paths with one end of the paths of each pair connected to opposite ends of a series resistor and the opposite ends of the paths connected to said common terminal, each shunt circuit path comprising a series connected resistor and switch, means operating said switches in response to digital signals to control the attenuation of an analog input signal from said analog signal source connected between the input and common terminals, the input resistance of said attenuator being substantially constant in all switch conditions.

2. The attenuator as defined in claim 1 wherein the means operating said switches are arranged to operate the switches in one pair of paths in a complimentary manner.

3. The attenuator as defined in claim 1 including at least two pairs of said shunt circuit paths connected to one series resistor, the switches in each pair of paths being simultaneously opened and closed, with the switches in only one pair of shunt circuit paths for said one series resistor being closed at any one time.

4. A variable attenuator having a plurality of attenuator sections, an input terminal, an output terminal, and a common terminal, said input and common terminals being adapted for connection across an analog signal source, each attenuator section comprising a series resistance path and at least one pair of shunt circuit paths, the series resistance paths being connected together in series between said input and output terminals, and the pair of shunt circuit paths being connected between said series resistance paths and said common terminal with the paths of each pair of shunt circuit paths connected to opposite ends of the series resistance paths, each shunt circuit path including a series connected resistor and switch, and means operating said switches in response to digital signals to control the attenuation of an analog input signal applied between the input and common terminals, the input resistance of each attenuator section being substantially constant for all switch conditions.

5. The attenuator as defined in claim 4 which includes at least first, second, and third series connected attenuator sections, the second section having an input resistance substantially equal to the design load resistance of the first section, and the third section having an input resistance substantially equal to the design load resistance of the second section, the input resistance of the second and third sections being unequal.

6. The attenuator as defined in claim 4 which includes at least first, second, and third series connected attenuator sections, the second section having an input resistance substantially equal to the design load resistance of the first section, and the third section having an input resistance substantially equal to the design load resistance of the second section, and input resistance of the second and third sections being equal.

7. The attenuator as defined in claim 4 wherein the input resistance of at least two attenuator sections is substantially equal.

8. The attenuator as defined in claim 4 wherein the input resistance of at least two adjacent attenuator sections are unequal to minimize the insertion loss of the attenuator.

9. A variable attenuator comprising, a plurality of pilike networks connected in series with means for connecting an analog signal source to one end and a load to the other end thereof, each network comprising a series branch and a pair of shunt branches, and means for switching the shunt branches into and out of operation in the network to change the attenuation of the analog signal without substantially changing the input resistance of the network.

10. The attenuator as defined in claim 9 wherein said switching means for each pair of shunt branches comprises a pair of switches in the shunt branches operated in a complementary manner.

11. The attenuator as defined in claim 9 wherein at least one of said networks comprises a plurality of pairs of shunt branches, and said switching means for said one network includes means for selectively switching only one pair of shunt branches into operation and the remaining pairs out of operation.

12. The attenuator as defined in claim 11 including a quinary counter having a plurality of output signals for control of the switching means.

13. The attenuator as defined in claim 11 wherein said one network attenuates the analog signal from the signal source a first amount with one pair of shunt branches switched into the network and attenuates the analog signal a different amount with another pair of shunt branches switched into the network.

14. An attenuator comprising a binary operated pilike network and a quinary operated pilike network, means directly connecting the networks together in series circuit, means for connecting one end of the series connected networks to an analog signal source and the other end to a load, said binary operated network comprising a first series resistance branch and a first pair of shunt circuit branches, said quinary operated network comprising a second series resistance branch and a plurality of pairs of shunt circuit branches, each of said shunt circuit branches comprising a series connected resistor and switch, and quinary-binary operated switching means for actuating said switches to change the attenuation of the signal from the analog input signal source without changing the input resistance of the networks.